United States Patent [19]

Rempel et al.

[11] Patent Number: 4,503,196

[45] Date of Patent: Mar. 5, 1985

[54] POLYMER HYDROGENATION PROCESS

[75] Inventors: Garry L. Rempel; Hormoz Azizian, both of Waterloo, Canada

[73] Assignee: Polysar Limited, Sarnia, Canada

[21] Appl. No.: 541,252

[22] Filed: Oct. 12, 1983

[30] Foreign Application Priority Data

Dec. 8, 1982 [CA] Canada ................................. 417260

[51] Int. Cl.$^3$ .............................................. C08F 8/04
[52] U.S. Cl. ................................................... 525/338
[58] Field of Search ................................ 525/338, 339

[56] References Cited

U.S. PATENT DOCUMENTS 3,366,646  1/1968  Dewhirst ........................... 525/338
3,898,208  8/1975  Krause ............................... 260/85.1

Primary Examiner—Paul R. Michl
Attorney, Agent, or Firm—Stevens, Davis, Miller & Mosher

[57] ABSTRACT

A process is provided for the selective hydrogenation of the carbon-carbon double bonds in a copolymer of a conjugated diene and one or more copolymerizable monomers which comprises hydrogenating the copolymer in the presence of a monovalent rhodium hydride complex catalyst of the general formula $RhHL_x$ wherein x is 3 or 4 and L is a ligand compound. The hydrogenation is carried out in an organic solvent in which the copolymer and catalyst are soluble and in the absence of additional ligand compound.

6 Claims, No Drawings

POLYMER HYDROGENATION PROCESS

This invention relates to a process for the selective hydrogenation of the carbon-carbon double bonds in a copolymer of a conjugated diene and one or more copolymerizable monomers.

A variety of processes are known for the hydrogenation of carbon-carbon double bonds in polymers including processes using either homogeneous or heterogeneous catalysts. French Pat. No. 2,421,923 teaches the partial hydrogenation of the double bonds in acrylonitrile-butadiene rubber (NBR) over a palladium/charcoal catalyst. German Offenlegungsschrift No. 3,046,008 teaches the selective hydrogenation of the double bonds in conjugated diene containing polymers such as NBR, wherein the catalyst is palladium and at least one other element on a support which may be silica, alumina or activated carbon. German Offenlegungsschrift No. 3,046,251 teaches a similar process except that the catalyst support is channel or furnace carbon black.

British Patent Application No. 2,070,023A teaches a process for the selective hydrogenation of the double bonds in unsaturated organic polymers such as acrylonitrile-butadiene-styrene polymers, when in the form of an aqueous emulsion, using a catalyst such as chlorotris(triphenylphosphine)rhodium in a hydrocarbon solution.

U.S. Pat. No. 3,898,208 teaches a process for hydrogenation of latexes of oil-insoluble polymers of conjugated dienes. The latex is dispersed in a swelling agent for the polymer and hydrogenated in the presence of a catalyst complex which may be a rhodium complex catalyst such as chlorotris(triphenylphosphine)rhodium. The swelling agent must also be a solvent for the catalyst complex.

U.S. Pat. No. 3,700,637 teaches that the double bonds in alternating copolymers of conjugated dienes and unsaturated nitriles may be hydrogenated using catalysts which preferably are homogeneous rhodium halide complex catalysts having the formula $L_3RhX$ wherein X is halogen and L is a organophosphorus or organoarsenic stabilizing ligand. It is also preferred that an excess of the ligand be used during the hydrogenation, the mole ratio of ligand to rhodium complex being between about 10:1 and about 150:1.

British Pat. No. 1,558,491 teaches the hydrogenation of the double bonds in copolymers of a conjugated diene and an α,β-unsaturated carboxylic acid or derivative thereof, for example acrylonitrile, using as catalyst a homogeneous monovalent or trivalent rhodium halide complex of the formula $L_3RhX_n$ wherein X is chlorine or bromine, n is 1 or 3, and L is a ligand. An additional 5-25 weight percent, based on the copolymer, of the ligand may optionally be used. The amount of hydrogenation is highly solvent dependent.

U.S. Pat. No. 3,480,659 teaches a process for the selective hydrogenation of double bonds in unsaturated monomers containing 2 to 20 carbon atoms using a homogeneous rhodium hydride complex catalyst, for example hydridotetrakis(triphenylphosphine)rhodium, along with an excess of a complexing ligand, for example triphenylphosphine. The mole ratio of ligand to catalyst is between about 10:1 and about 150:1.

Italian Pat. No. 912,648 teaches that cycloalkadienes and alkadienes may be selectively hydrogenated to the corresponding cycloalkenes and alkenes using a catalyst such as hydridotetrakis(triphenylphosphine)rhodium.

It is desirable to have a process for the selective hydrogenation of the carbon-carbon double bonds in copolymers wherein improved rates of hydrogenation can be achieved under relatively mild reaction conditions and wherein the amount of hydrogenation is relatively insensitive to the type of solvent used.

It is an object of the present invention to provide an improved process for the selective hydrogenation of the carbon-carbon double bonds in a copolymer of a conjugated diene and one or more copolymerizable monomers wherein the copolymer is hydrogenated in solution in the presence of a homogeneous catalyst.

Accordingly, the present invention provides an improved process for the selective hydrogenation of the carbon-carbon double bonds in a copolymer of a conjugated diene and one or more copolymerizable monomers which comprises hydrogenating said copolymer at a temperature of from about 35° to about 100° C. and at a pressure of hydrogen of from about 0.05 to about 7 MPa the improvement being that said hydrogenation is carried out in the presence of from about 2.5 to about 40 percent by weight of a catalyst which is a monovalent rhodium hydride complex of the general formula $RhHL_x$ in which x is 3 or 4 and L is a ligand compound wherein when x is 4, L is a phosphorus compound selected from 5-phenyl-5H-dibenzophosphole and compounds of the formula $PR_1R_2R_3$ and when x is 3, L is an arsenic or antimony compound of the formula $MR_1R_2R_3$ wherein M is arsenic or antimony and wherein $R_1$, $R_2$ and $R_3$ may be the same or different and are selected from $CH_3$, $C_2H_5$, $C_{6-10}$ aryl groups and $C_{7-12}$ aralkyl groups, the hydrogenation being carried out in an organic solvent in which said copolymer and said catalyst are soluble and in the absence of any additional amounts of said ligand compound, the concentration of said copolymer in the solution being from about 0.05 to about 20 percent by weight based on the total weight of said solution.

The copolymer is dissolved in the solvent and the resulting solution is degassed. The reaction vessel containing the copolymer solution is pressured with hydrogen gas and the catalyst added to and dissolved in the solution or, alternatively, the catalyst is added to and dissolved in the solution and then the reaction vessel is pressured with hydrogen. The reaction vessel is rapidly heated to the desired temperature and agitation is initiated. The hydrogenation reaction is allowed to proceed for the desired length of time with the pressure of hydrogen preferably but not necessarily being held constant. Upon completion of the reaction the hydrogenated copolymer may be recovered by any convenient method well known in the art. For example, the reaction mixture may be mixed with an alcohol or contacted with hot water and/or steam in order to precipitate the copolymer which is then separated, washed if desired, and dried e.g. under vacuum in a hot air oven. If desired, the catalyst may be recovered by the method described in U.S. Pat. No. 3,545,963.

The solvent may be any organic solvent in which the copolymer and catalyst are essentially soluble and which is not adversely affected by the hydrogenation conditions. Suitable such solvents include the aryl hydrocarbons and their alkyl and halo derivatives such as benzene, toluene, xylene and chlorobenzene, halogenated aliphatic hydrocarbons such as methylene chloride, 1,1,2-trichloroethane and dichloroethane, aliphatic ethers such as tetrahydrofuran, certain ketones such as acetone, and mixtures thereof. Acetone is reduced to some extent to form isopropanol under the reaction conditions but this does not interfere with the desired hydrogenation of the copolymer. Other ketones may be reduced to a greater extent with the possibility of precipitating the copolymer from solution and thereby limiting the amount of hydrogenated copolymer produced. Such ketones should therefore be used with caution. The concentration of polymer in the solution is from about 0.05 to about 20 percent by weight of the copolymer and preferably from about 1 to about 5 percent by weight based on the total weight of the solution.

Catalyst is used in an amount from about 2.5 to about 40 percent by weight based on the weight of the copolymer and preferably from about 4 to about 15 percent by weight. Suitable catalysts include hydridotetrakis(-trimethyl-, triethyl- and triphenylphosphine)rhodium, and hydridotris(triphenylarsine)rhodium. The preferred catalyst is hydridotetrakis(triphenylphosphine)rhodium. It has been found that when the amount of catalyst used is from about 2.5 to about 40 percent by weight, no additional ligand compound is required to stabilize the catalyst complex against ligand dissociation from the complex. When amounts of catalyst below about 2.5 percent are used, catalyst decomposition occurs, thereby significantly reducing the yield of the desired hydrogenated copolymer.

The reaction vessel is pressured with gaseous hydrogen to a pressure of hydrogen of from about 0.05 to about 7 MPa and preferably from about 0.07 to about 1.5 MPa. It is preferred that pure hydrogen gas be used. However, hydrogen gas containing very small amounts of inert gases such as nitrogen may also be used.

The hydrogenation reaction is carried out at a temperature of from about 35° to about 100° C. and preferably from about 40° to about 85° C. Under the preferred conditions of temperature and pressure, essentially complete hydrogenation of the carbon-carbon double bonds may be achieved in from about 1 to about 50 hours. Preferred reaction times may be from about 5 to about 20 hours. By using suitable conditions of time and temperature it is possible to obtain copolymers which are only partially hydrogenated. The amount of hydrogenation may be adjusted to suit the requirements for the product required.

The copolymers containing carbon-carbon double bonds which may be hydrogenated by the process of the present invention are copolymers of a conjugated diene with one or more copolymerizable monomers. The copolymers may be of random, alternating or block structure. Suitable conjugated dienes include $C_{4-6}$ conjugated dienes such as butadiene, isoprene, dimethylbutadiene and piperylene. Suitable copolymerizable monomers include acrylonitrile and methacrylonitrile, alkenylaromatic hydrocarbons such as styrene and $\alpha$-methylstyrene, and $C_{3-6}$ $\alpha,\beta$-unsaturated mono- or polycarboxylic acids such as itaconic, fumaric, maleic, acrylic and methacrylic acids. Preferred copolymers include butadiene-(meth)acrylonitrile copolymers, copolymers of butadiene with (meth)acrylonitrile and one or more of the $C_{3-6}$ $\alpha,\beta$-unsaturated carboxylic acids, isoprene-(meth)acrylonitrile copolymers, and AB, ABA and ABCBA block copolymers wherein A may be butadiene or isoprene, B may be styrene or $\alpha$-methylstyrene, and C may be coupling agent residue.

The hydrogenated products of the process of the present invention are vulcanizable elastomers the vulcanizates of which may be used in applications requiring resistance to oxidizing conditions at elevated temperatures for extended periods of time as for example in the various hoses and seals in the engine compartment of an automobile. These hydrogenated copolymers may be vulcanized using conventional peroxide or peroxide/sulfur curing systems. It is preferred to use vulcanizates in which from about 50 to about 99.95 percent, more preferably from about 95 to about 99.95 percent, and most preferably from about 99 to about 99.95 percent of the carbon-carbon double bonds in the copolymer have been hydrogenated.

The following examples illustrate the present invention and are not intended to be limiting.

EXAMPLE 1

In this and succeeding examples, the copolymers which were hydrogenated are listed in Table 1. The composition figures are given in percent by weight.

TABLE 1

| Copolymer | Composition |
|---|---|
| I | An acrylonitrile-butadiene copolymer containing 66 percent butadiene sold under the trade name KRYNAC 34.50 by Polysar Limited. |
| II | An acrylonitrile-butadiene copolymer containing 60 percent butadiene sold under the trade name KRYNAC 40.65 by Polysar Limited. |
| III | An acrylonitrile-isoprene copolymer containing 66 percent isoprene sold under the trade name KRYNAC 833 by Polysar Limited. |
| IV | A carboxylated acrylonitrile-butadiene copolymer containing 64 percent butadiene sold under the trade name KRYNAC 221 by Polysar Limited. |
| V | A carboxylated acrylonitrile-butadiene copolymer containing 66 percent butadiene sold under the trade name KRYNAC 110C by Polysar Limited. |
| VI | A styrene-butadiene-styrene block copolymer containing 79 percent butadiene sold under the trade name KRATON 1102 by Shell Chemical Company. |

Each of the six copolymers listed in Table 1 was hydrogenated in several separate runs using hydridotetrakis(triphenylphosphine)rhodium as catalyst.

All of the runs were carried out using a constant pressure gas uptake apparatus which was very similar to that described by J. L. Bolland in "The Proceedings of the Royal Society", Volume A186, p. 218–236, 1946. The procedure used was that an amount of copolymer was dissolved in 10 ml of the solvent shown in Table 2 to provide the copolymer concentration shown in percent by weight based on the total weight of the resulting solution. The copolymer was dissolved under a nitrogen atmosphere in the solvent contained in a 50 ml two-necked flask. The side arm of the flask was equipped with a quick fit extended cone with an attached hook from which could be suspended a glass bucket. 25 mg of the catalyst were placed in the bucket which was then suspended from the hook. The cone with the suspended bucket was inserted into the side arm of the flask. The solution in the flask was degassed under vacuum by repeated freezing with liquid nitrogen and thawing. Hydrogen gas was then admitted to the flask to provide a pressure of about that shown in Table 2. The flask was immersed in a silicone oil bath, maintained at the temperature shown in Table 2 to within ±0.1° C. and a piston rod driven by a variable speed electric motor was attached to the flask so that operation of the motor could provide a rapid shaking motion to the flask and its contents. The hydrogen pressure was adjusted to the reaction pressure shown in Table 2, operation of the motor initiated and the flask and its contents shaken for about 0.5 hour to ensure equilibrium of the hydrogen dissolved in the copolymer solution and that in the gaseous phase. The cone was turned so that the bucket and its contents fell into the solution. Shaking was resumed and as the reaction proceeded, hydrogen gas was introduced into the system to maintain the initial pressure. The hydrogen consumption was measured by the rise in the mercury level in the precision bore tubing of the apparatus. After the reaction time shown in Table 2, the reaction mixture was cooled to room temperature and the flask disconnected from the apparatus. 20 ml of isopropanol were added to the reaction mixture, and the hydrogenated copolymer product which precipitated out was separated by filtration, washed with isopropanol and dried under vacuum at 50° C. The product from several runs was analyzed by proton NMR to determine the amount of hydrogenation of the carbon-carbon double bonds. A relationship was established between the amount of hydrogenation measured by proton NMR and the amount of hydrogen gas consumed measured in the precision bore tubing. In subsequent runs the quantitative consumption of hydrogen was used to determine the amount of hydrogenation. Analysis by carbon 13 NMR showed that no hydrogenation of the nitrile groups in the Copolymers I through V had occurred and analysis by IR spectroscopy showed that no hydrogenation of the carboxylic acid groups in Copolymers IV and V had occurred. Figures given in Table 2 and in the examples which follow are for the percent of the carbon-carbon double bonds of the copolymer which have been hydrogenated. When a value of 99+ is given, the amount of hydrogenation is greater than 99 percent and less than or equal to 99.95 percent, i.e. essentially complete hydrogenation.

solution degassed. The autoclave was purged by repeatedly pressuring it with nitrogen or argon for a period of 5 minutes and then releasing the pressure. The autoclave was opened briefly and the amount of catalyst necessary to provide the concentration shown in Table 3 in percent by weight based on the copolymer was added, and the autoclave closed and pressured with hydrogen to 2.8 MPa for a period of 5 minutes. The pressure was released and then the autoclave was repressured with hydrogen to the pressure shown in Table 3 and heated rapidly over a period of 15–20 minutes to the temperature shown in the table. Stirring was initiated and the reaction allowed to proceed for the length of time shown. Hydrogen gas was added as required to maintain the pressure essentially constant throughout the reaction period.

After the reaction time shown, the autoclave was cooled rapidly in an ice-salt bath, depressured and opened. About 1 l of isopropanol was added to the reaction product and the product which precipitated out of solution was separated by filtration, washed with isopropanol and dried under vacuum at 50° C.

In the comparative runs 3, 4 and 5, catalyst decomposition was evident in each as shown by a rapid discolouration of the reaction medium. In runs 1 and 2, illustrating the process of the present invention, no such discolouration was observed. Proton NMR analysis of the product of each run showed only a limited amount of hydrogenation of the carbon-carbon double bonds of the copolymer had occurred in comparative runs 3, 4 and 5 while in runs 1 and 2, analysis showed that 99+ percent by hydrogenation had occurred.

TABLE 3

| Run No. | Catalyst Concentration | Hydrogen Pressure (MPa) | Reaction Temperature (°C.) | Reaction Time (hr) | Percent Hydrogenation |
|---|---|---|---|---|---|
| 1 | 5.0 | 0.3 | 85 | 4.0 | 99+ |
| 2 | 5.0 | 1.4 | 85 | 2.5 | 99+ |
| 3 | 1.0 | 0.3 | 85 | 6.5 | 50 |
| 4 | 1.0 | 0.7 | 85 | 6.0 | 32 |
| 5 | 1.0 | 1.4 | 88 | 3.3 | 37 |

TABLE 2

| Run No. | Copolymer Type | Conc. | Hydrogen Pressure (MPa) | Reaction Temp. (°C.) | Solvent | Reaction Time (hr) | Percent Hydrogenation |
|---|---|---|---|---|---|---|---|
| 1 | I | 1.6 | 0.09 | 40 | chlorobenzene | 17 | 70 |
| 2 | I | 1.6 | 0.09 | 55 | chlorobenzene | 19 | 91 |
| 3 | I | 1.6 | 0.08 | 65 | chlorobenzene | 6.0 | 85 |
| 4 | I | 1.6 | 0.07 | 80 | chlorobenzene | 8.5 | 99+ |
| 5 | II | 1.6 | 0.07 | 80 | chlorobenzene | 5.5 | 99+ |
| 6 | III | 1.6 | 0.07 | 80 | chlorobenzene | 19.3 | 50 |
| 7 | IV | 1.6 | 0.07 | 80 | chlorobenzene | 11 | 99+ |
| 8 | V | 1.6 | 0.07 | 80 | chlorobenzene | 7.0 | 99+ |
| 9 | VI | 1.6 | 0.07 | 80 | chlorobenzene | 5.0 | 99+ |
| 10 | I | 2.0 | 0.09 | 40 | p-xylene | 18.5 | 65 |

EXAMPLE 2

Copolymer I of Table 1 was hydrogenated in several runs. Runs 1 and 2 illustrate the process of the present invention while runs 3, 4 and 5 are comparative wherein the concentration of the catalyst used was less than about 2.5 percent by weight based on the copolymer. The catalyst used in each run was hydridotetrakis(triphenylphosphine)rhodium.

The procedure used for each run was that 9.6 g of the copolymer was dissolved in 350 ml of chlorobenzene to provide a 2.5 percent by weight solution which was then transferred to a 1.5 l glass lined autoclave and the

EXAMPLE 3

The procedure used in this example was similar to that of Example 1. 0.1 g of copolymer I from Table 1 was dissolved in 10 ml of toluene to give a 1.0 percent by weight solution. The copolymer was hydrogenated in the presence of 0.036 g of hydridotetrakis(triethylphosphine)rhodium, the hydrogen pressure being 0.06 MPa and the reaction temperature 80° C. The reaction was allowed to proceed for 6 hours and the product was recovered. Proton NMR analysis showed that 99+ percent of the carbon-carbon double bonds had been hydrogenated.

EXAMPLE 4

A hydrogenated copolymer of butadiene and acrylonitrile may be cured using a peroxide or a peroxide/sulfur vulcanization system to produce vulcanizates having useful elastomeric properties after air aging for up to 1,000 hours at 150° C.

What is claimed is:

1. An improved process for the selective hydrogenation of the carbon-carbon double bonds in a copolymer of a conjugated diene and one or more copolymerizable monomers which comprises hydrogenating said copolymer at a temperature of from about 35° to about 100° C. and at a pressure of hydrogen of from about 0.05 to about 7 MPa the improvement being that said hydrogenation is carried out in the presence of from about 2.5 to about 40 percent by weight of a catalyst which is a monovalent rhodium hydride complex of the general formula $RhHL_x$ in which x is 3 or 4 and L is a ligand compound wherein when x is 4, L is a phosphorus compound selected from 5-phenyl-5H-dibenzophosphole and compounds of the formula $PR_1R_2R_3$ and when x is 3, L is an arsenic or antimony compound of the formula $MR_1R_2R_3$ wherein M is arsenic or antimony and wherein $R_1$, $R_2$ and $R_3$ may be the same or different and are selected from $CH_3$, $C_2H_5$, $C_{6-10}$ aryl groups and $C_{7-12}$ aralkyl groups, the hydrogenation being carried out in an organic solvent in which said copolymer and said catalyst are soluble and in the absence of any additional amounts of said ligand compound, the concentration of said copolymer in the solution being from about 0.05 to about 20 percent by weight based on the total weight of said solution.

2. The process according to claim 1 wherein said copolymer is selected from the group consisting of butadiene-(meth)acrylonitrile copolymers, isoprene-(meth)acrylonitrile copolymers, copolymers of butadiene with (meth)acrylonitrile and one or more monomers selected from itaconic acid, fumaric acid, (meth)acrylic acid, and maleic acid, and AB, ABA and ABCBA block copolymers wherein A may be butadiene or isoprene, B may be styrene or α-methylstyrene, and C may be a coupling agent residue.

3. The process according to claim 2 wherein said solvent is selected from the group consisting of chlorobenzene, benzene, toluene, xylene, acetone, 1,1,2-trichloroethane, and mixtures thereof and wherein the concentration of said solution is from about 1 to about 5 percent by weight.

4. The process according to claim 2 wherein said catalyst is hydridotetrakis(triphenylphosphine)rhodium.

5. The process according to claim 4 wherein the amount of said catalyst is from about 4 to about 15 percent by weight.

6. The process according to claim 5 wherein said pressure of hydrogen is from about 0.07 to about 1.5 MPa and said temperature is from about 40° to about 85° C.

* * * * *